United States Patent
Aizawa et al.

(10) Patent No.: US 8,284,372 B2
(45) Date of Patent: Oct. 9, 2012

(54) LIQUID CRYSTAL DISPLAY PANEL AND METHOD FOR MANUFACTURING SAME, AND LIQUID CRYSTAL DISPLAY DEVICE

(75) Inventors: Masashi Aizawa, Kanagawa-ken (JP); Atsuo Inoue, Kanagawa-ken (JP); Yasutada Nakagawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1068 days.

(21) Appl. No.: 12/123,861

(22) Filed: May 20, 2008

(65) Prior Publication Data
US 2008/0291385 A1    Nov. 27, 2008

(30) Foreign Application Priority Data
May 24, 2007 (JP) ................. 2007-138370

(51) Int. Cl.
*G02F 1/1339* (2006.01)
(52) U.S. Cl. ........................ 349/155; 349/156
(58) Field of Classification Search .................. 349/153, 349/155, 156
See application file for complete search history.

(56) References Cited

U.S. PATENT DOCUMENTS 5,815,232 A * 9/1998 Miyazaki et al. ............. 349/155
6,744,486 B2 * 6/2004 Kim et al. ..................... 349/187

FOREIGN PATENT DOCUMENTS

| JP | 2000-75271 | 3/2000 |
|---|---|---|
| JP | 2002-341354 | 11/2002 |
| JP | 2003-121857 | 4/2003 |
| JP | 2005-208583 | 8/2005 |
| JP | 2005-242309 | 9/2005 |
| WO | WO 2005/038518 A1 | 4/2005 |

OTHER PUBLICATIONS

Office Action issued Dec. 22, 2011 in Japan Application No. 2007-138370 (With English Translation).

* cited by examiner

*Primary Examiner* — Richard Kim
*Assistant Examiner* — David Chung
(74) *Attorney, Agent, or Firm* — Oblon, Spivak, McClelland, Maier & Neustadt, L.L.P.

(57) ABSTRACT

A liquid crystal display panel includes: a pair of substrates; a cylindrical spacer configured to hold a gap between the pair of substrates, and a liquid crystal which fills the gap. The cylindrical spacer includes a first support portion having a first support surface and a second support portion having a second support surface. The first support portion is provided inside the second support surface so that the first support surface is projected from the second support surface. The second support portion is provided on a major surface of one of the substrates the second support surface from the major surface.

11 Claims, 7 Drawing Sheets

LIQUID CRYSTAL DISPLAY PANEL AND METHOD FOR MANUFACTURING SAME, AND LIQUID CRYSTAL DISPLAY DEVICE

CROSS-REFERENCE TO RELATED APPLICATIONS

This application is based upon and claims the benefit of priority from the prior Japanese Patent Application No. 2007-138370, filed on May 24, 2007; the entire contents of which are incorporated herein by reference.

BACKGROUND OF THE INVENTION

1. Field of the Invention

This invention relates to a liquid crystal display panel and a method for manufacturing the same, and a liquid crystal display device.

2. Background Art

Liquid crystal display devices are used in various household electrical appliances and information terminals including television sets, personal computers, and mobile phones. A liquid crystal display panel used in the liquid crystal display device comprises a pair of glass or other substrates opposed to each other, a spacer for holding the gap (spacing) between the pair of substrates, and a liquid crystal packed in the space formed by the pair of substrates and the spacer.

If the spacer has an unnecessarily high strength, the shrinkage of the spacer cannot follow the shrinkage of the liquid crystal having a large shrinkage ratio under low-temperature environment such as at approximately −10° C. Thus the packed liquid crystal is subjected to negative pressure and is likely to generate low-temperature bubbles.

On the other hand, if the strength of the spacer is decreased, the shrinkage of the spacer under low-temperature environment is facilitated, and the generation of low-temperature bubbles can be prevented. However, if the strength is too low, the gap between the substrates is varied upon local application of an excessive load, and color unevenness is likely to occur.

Some techniques to solve the above problem have been proposed. JP-A 2002-341354(Kokai) (hereinafter referred to as Patent Document 1) discloses a technique of using two types of spacers having different heights to prevent the generation of low-temperature bubbles and to avoid color unevenness due to external force. JP-A 2003-121857(Kokai) (hereinafter referred to as Patent Document 2) discloses a technique of using two or three types of spacers having different heights and cross-sectional areas to avoid color unevenness due to external force.

In the techniques disclosed in Patent Documents 1 and 2, spacers having different heights are disposed. The substrate is supported with only the taller spacers during periods of low temperature, and is supported with the taller and shorter spacers during application of external force.

In this case, the taller spacers support the substrate both during periods of low temperature and during application of external force, and hence may undergo plastic deformation. Plastic deformation in the taller spacers results in substrate warp. This causes variation in the in-plane thickness of the liquid crystal, and may increase the possibility of color unevenness.

SUMMARY OF THE INVENTION

According to an aspect of the invention, there is provided a liquid crystal display panel including: a pair of substrates; a cylindrical spacer configured to hold a gap between the pair of substrates, and a liquid crystal which fills the gap the cylindrical spacer including a first support portion having a first support surface and a second support portion having a second support surface, the first support portion being provided inside the second support surface so that the first support surface is projected from the second support surface, and the second support portion being provided on a major surface of one of the substrates the second support surface from the major surface.

According to another aspect of the invention, there is provided a method for manufacturing a liquid crystal display panel, including: forming a film of a photocurable resin on one major surface of a substrate; and irradiating the film with light through a photomask to cure the photocurable resin, a first photomask being used to form a plurality of second support portions on the major surface so that a second support surface is projected from the major surface, and a second photomask being used to form a first support portion inside the second support surface so that a first support surface is projected from the second support surface of each of the plurality of second support portions.

According to another aspect of the invention, there is provided a method for manufacturing a liquid crystal display panel, including: forming a film of a photocurable resin on one major surface of a substrate; and irradiating the film with ultraviolet radiation through a photomask to cure the photocurable resin, the photomask having a plurality of transmitting portions having different transmittances for the ultraviolet radiation, and the photomask being used to form a plurality of second support portions on the major surface so that a second support surface is projected from the major surface, and to form a first support portion inside the second support surface so that a first support surface is projected from the second support surface of each of the plurality of second support portions.

According to another aspect of the invention, there is provided a liquid crystal display device including: a liquid crystal display panel; and a mechanism member including a driving circuit, the liquid crystal display panel including: a pair of substrates; a cylindrical spacer configured to hold a gap between the pair of substrates, and a liquid crystal which fills the gap the cylindrical spacer including a first support portion having a first support surface and a second support portion having a second support surface, the first support portion being provided inside the second support surface so that the first support surface is projected from the second support surface, and the second support portion being provided on a major surface of one of the substrates the second support surface from the major surface.

DETAILED DESCRIPTION OF THE INVENTION

Embodiments of the invention will now be described with reference to the drawings.

FIG. 1 is a schematic cross-sectional view for illustrating a liquid crystal display panel according to an embodiment of the invention. FIG. 2 is a schematic cross-sectional view for illustrating a liquid crystal display panel according to a comparative example.

First, a description is given of a liquid crystal display panel according to a comparative example investigated by the inventor in the process of perfecting the invention.

Figure 2A:
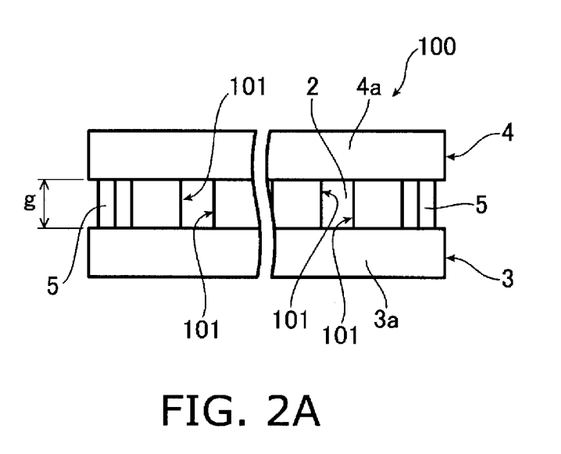
FIGS. 2A and 2B are schematic views for illustrating a liquid crystal display panel according to a comparative example.
Figure 2B:
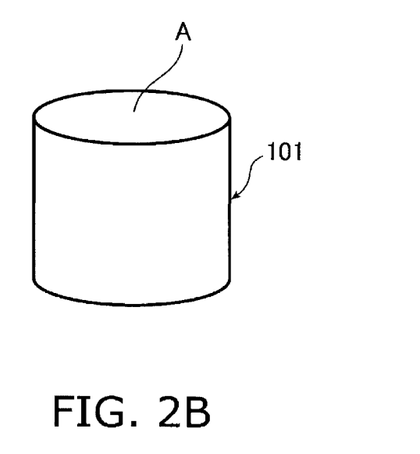

FIG. 2A is a schematic view for illustrating a cross section of a liquid crystal display panel according to the comparative example, and FIG. 2B is a schematic perspective view for illustrating a spacer according to the comparative example.

As shown in FIG. 2A, the liquid crystal display panel 100 comprises spacers 101, and a color filter substrate 3 and an array substrate 4 opposed to each other with a prescribed gap g via the spacers 101. A liquid crystal 2 is packed in the space formed by the spacers 101, the color filter substrate 3, and the array substrate 4. The color filter substrate 3 and the array substrate 4 are liquid-tightly bonded together along the periphery thereof via a seal member 5. The end surfaces of the spacers 101 are bonded to the color filter substrate 3 and the array substrate 4.

The color filter substrate 3 comprises a transparent substrate 3a made of glass or other transparent material. On the side of the transparent substrate 3a facing the liquid crystal 2, a shade film, not shown, a color filter layer having red, green, and blue pixels, not shown, a transparent electrode, not shown, and an orientation film, not shown, are laminated sequentially from the surface of the transparent substrate 3a.

The array substrate 4 comprises a transparent substrate 4a made of glass or other transparent material. On the side of the transparent substrate 4a facing the liquid crystal 2, switching elements having scan lines and signal lines, not shown, pixel electrodes, not shown, and an orientation film, not shown, are provided.

The spacer 101 can be made of various inorganic materials, organic materials, or composite materials with consideration given to insulation, weatherability, chemical resistance, and dimensional stability.

As shown in FIG. 2B, the spacer 101 according to the comparative example is shaped like a solid cylinder. The support area of the spacer 101 (cross-sectional area of the portion supporting the substrate) is denoted by A.

The gap g between the color filter substrate 3 and the array substrate 4 is held by the spacers 101. Here, the linear expansion coefficient $\alpha_{LC}$ of the liquid crystal 2 packed in the space formed by formed by the color filter substrate 3, the array substrate 4, and the spacers 101 is greater than the linear expansion coefficient $\alpha_{SS}$ of the spacer 101. Hence, if the temperature significantly decreases, the amount of shrinkage of the liquid crystal 2 exceeds the amount of shrinkage of the spacer 101. Thus free thermal shrinkage of the liquid crystal 2 may be prevented, resulting in decreased pressure.

The pressure decrease $\Delta P$ can be expressed by the following formula (1):

$$\Delta P = \frac{\rho E K (3\alpha_{LC} - \alpha_{SS})\Delta T}{K(1 + \alpha_{SS}\Delta T) + \rho E(1 + 3\alpha_{LC}\Delta T)} \quad (1)$$

where $\Delta T$ is the temperature variation, $\rho$ is the area density (total support area for all the spacers 101 disposed/total area of the display portion of the liquid crystal display panel), K is the bulk modulus of the liquid crystal 2, and E is the Young's modulus of the spacer 101.

Here, if the pressure decrease $\Delta P$ results in pressure lower than a prescribed threshold $P_C$ determined by the material properties of the liquid crystal 2, bubbles are generated. The bubbles are called low-temperature bubbles. Generation of low-temperature bubbles significantly deteriorates the display quality of the liquid crystal display panel.

As seen from formula (1), generation of low-temperature bubbles can be prevented by decreasing the area density $\rho$ to reduce the pressure decrease $\Delta P$ so that the pressure is higher than the threshold $P_C$.

On the other hand, the variation $\Delta g$ of the gap g upon application of external stress to the liquid crystal display panel 10 can be expressed by the following formula (2):

$$\Delta g = g_0(\epsilon_P/\sigma)(\sigma/\rho) \quad (2)$$

where $\rho$ is the area density, $g_0$ is the initial value of the gap, $\sigma$ is the stress applied to the liquid crystal display panel, and $\epsilon_P$ is the plastic strain of the material of the spacer 101 produced upon application of the stress $\sigma$.

As seen from formula (2), the variation $\Delta g$ of the gap g increases with the decrease of the area density $\rho$. If the variation $\Delta g$ becomes greater than an allowable variation $g_C$ of the gap, a failure called gap unevenness or color unevenness occurs.

Thus a tradeoff exists between the prevention of low-temperature bubbles and the prevention of gap/color unevenness, and it is difficult to simultaneously prevent both of them by adjusting only the area density $\rho$.

In this case, like the techniques disclosed in Patent Documents 1 and 2, spacers having different heights can be provided. Then, until the variation $\Delta g$ reaches a prescribed value, the substrate is supported with only the taller spacers to reduce the pressure decrease $\Delta P$, and after the variation $\Delta g$ reaches the prescribed value, the substrate is supported with all the spacers to decrease the variation $\Delta g$. Thus it is indeed possible to simultaneously prevent low-temperature bubbles and gap/color unevenness.

However, in such techniques, unless the variation $\Delta g$ increases to some extent, the substrate cannot be supported with the shorter spacers disposed at positions where the substrate is to be supported. Hence, depending on the operating environment and the magnitude of externally applied stress, substrate warp is likely to occur in this portion (between the taller spacers). The substrate warp causes variation in the in-plane thickness of the liquid crystal, and may increase the possibility of color unevenness.

Furthermore, stress is applied to the taller spacer both during periods of low temperature and during application of external force, and hence may undergo plastic deformation. Plastic deformation in the taller spacers results in substrate warp. This also causes variation in the in-plane thickness of the liquid crystal, and may increase the possibility of color unevenness.

As a result of investigations, the inventor has discovered that a spacer 1 having a first support surface 1a and a second support surface 1b for supporting the substrate with the first support surface 1a projected from the second support surface 1b can simultaneously prevent low-temperature bubbles and gap/color unevenness, and can also prevent substrate warp which otherwise occurs between the spacers 1. The inventor has also discovered that, because the height of the spacers can be equalized, the stress applied to the spacers can be distributed to also prevent the plastic deformation of the spacer.

Figure 1A:
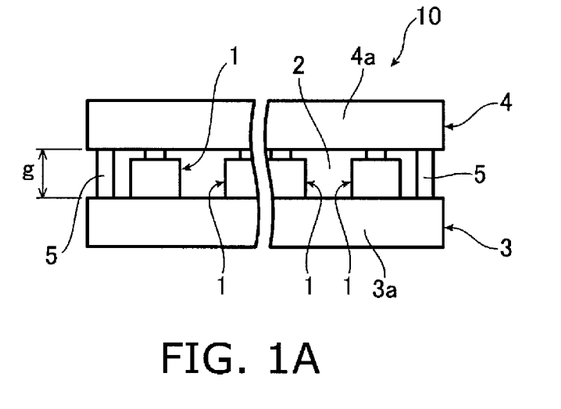
FIGS. 1A and 1B are schematic views for illustrating a liquid crystal display panel according to an embodiment of the invention.
Figure 1B:
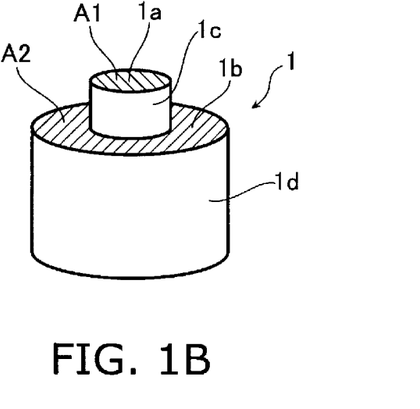

FIG. 1A is a schematic view illustrating a cross section of a liquid crystal display panel according to the embodiment of the invention, and FIG. 1B is a schematic perspective view illustrating a spacer according to the embodiment of the invention.

The same portions as those described with reference to FIG. 2 are marked with like reference numerals, and the description thereof is omitted.

As shown in FIG. 1A, the liquid crystal display panel 10 comprises a plurality of cylindrical spacers 1, and a color filter substrate 3 and an array substrate 4 opposed to each other with a prescribed gap g via the spacers 1. A liquid crystal 2 is packed in the space formed by the spacers 1, the color filter substrate 3, and the array substrate 4. The color filter substrate 3 and the array substrate 4 are liquid-tightly bonded together along the periphery thereof via a seal member 5. The end surfaces of the spacers 1 are bonded or abutted to the color filter substrate 3 and the array substrate 4. It is also possible to mix the spacers 1 having bonded end surfaces with those having abutted end surfaces.

The spacer 1 can be made of various inorganic materials, organic materials, or composite materials with consideration given to insulation, weatherability, chemical resistance, and dimensional stability. However, if the spacer is formed by photolithography as described later, it is preferably made of a photocurable resin.

As shown in FIG. 1B, the spacer 1 has a first support portion 1c and a second support portion 1d. One end surface of the first support portion 1c serves as a first support surface 1a, and one end surface of the second support portion 1d serves as a second support surface 1b. The first support portion 1c is provided on an inner side of the second support surface 1b so that the first support surface 1a is projected from the second support surface 1b. The second support portion 1d is provided on the major surface of the color filter substrate 3 so that the second support surface 1b is projected from the major surface of the color filter substrate 3. It is noted that the second support portion 1d can alternatively be provided on the major surface of the array substrate 4.

Here, let A1 denote the support area (cross-sectional area of the circular cross section) of the first support surface 1a, and A2 the support area (cross-sectional area of the annular portion) of the second support surface 1b. Hence the cross-sectional area of the second support portion 1d equals A1+A2.

In the spacer 1 like this, if the relation between the support area A1 of the first support surface 1a and the support area A of the spacer 101 of the comparative example satisfies the following formula (3), the spacer 1 can be allowed to shrink more easily than the spacer 101. This allows free thermal shrinkage of the liquid crystal 2 and facilitates preventing the generation of low-temperature bubbles. In this case, the support area A can be set to the support area of a known cylindrical spacer, and the spacer 1 satisfying the relation of formula (3) can be easily designed.

$$A_1 < A \quad (3)$$

If the threshold $P_C$ at which low-temperature bubbles start to appear is known, it is only necessary that $\Delta P$ not exceed $P_C$, that is, the condition of the following formula (4) be satisfied:

$$|\Delta P| < |P_C| \quad (4)$$

Hence, as a requirement for the area density $\rho_1$ (total of the support area A1 for all the spacers 1 disposed/total area of the display portion of the liquid crystal display panel), the following formula (5) can be derived from formulas (1) and (4):

$$\rho_1 < \frac{KP_C(1 + \alpha_{SS}\Delta T)}{E[K(3\alpha_{LC} - \alpha_{SS})\Delta T - P_C(1 + 3\alpha_{LC}\Delta T)]} \quad (5)$$

In formula (5), the shrinkage of the liquid crystal display panel 10 in the thickness direction is taken into consideration. However, because the color filter substrate 3 and the array substrate 4 have only a slight amount of shrinkage in the thickness direction, it is not taken into consideration.

In this case, the amount of shrinkage of the color filter substrate 3 and the array substrate 4 in the plane direction is greater than that in the thickness direction. However, if shrinkage in the plane direction is also taken into consideration, the calculation formula is complicated despite increased accuracy, and may conversely pose an obstacle to practical application.

As a result of investigations, the inventor has discovered that a requirement for the area density $\rho_1$ with shrinkage in the plane direction also taken into consideration can be simply determined by correcting the linear expansion coefficient $\alpha_{LC}$ Of the liquid crystal and the linear expansion coefficient as $\alpha_{SS}$ of the spacer using factors experimentally determined in advance.

The following formula (6) is derived from this discovery:

$$\rho_1 < \frac{KP_C(1 + f_1\alpha_{SS}\Delta T)}{E[K(3f_2\alpha_{LC} - f_1\alpha_{SS})\Delta T - P_C(1 + 3f_2\alpha_{LC}\Delta T)]} \quad (6)$$

where $f_1$ is a factor for correcting the linear expansion coefficient as $\alpha_{SS}$ of the spacer, and $f_2$ is a factor for correcting the linear expansion coefficient $\alpha_{LC}$ of the liquid crystal. The factors depend on the ratio of the linear expansion coefficient of the substrate to the linear expansion coefficient of the liquid crystal and the ratio of the linear expansion coefficient of the substrate to the linear expansion coefficient of the spacer, and are specifically determined by experiments because they are affected by the respective materials and dimensions and the configuration of the liquid crystal display panel.

The variation in the axial length (height) of the first support portion 1c (variation $\Delta g_1$ of the gap corresponding to the first support portion 1c) during periods of low temperature can be expressed by the following formula (7):

$$\Delta g_1 = g_0\left[1 - \frac{(K + \rho_1 E)(1 + \alpha_{SS}\Delta T)(1 + 3\alpha_{LC}\Delta T)}{K(1 + \alpha_{SS}\Delta T) + \rho_1 E(1 + 3\alpha_{LC}\Delta T)}\right] \quad (7)$$

where $g_0$ is the initial value of the gap g, and $\rho_1$ is the area density of the first support surface 1a.

During periods of low temperature, generation of low-temperature bubbles can be prevented by supporting the substrate with only the first support portion $1c$ to reduce the pressure decrease $\Delta P$.

In this case, if the axial length (height) of the first support portion $1c$ is greater than the variation expressed by formula (7), the substrate can be supported with only the first support portion $1c$ during periods of low temperature. This leads to the relation of the following formula (8):

$$g_1 > \Delta g_1 \quad (8)$$

where $g_1$ is the axial length (height) of the first support portion $1c$.

From formulas (7) and (8), the following formula (9) is derived as a requirement to be satisfied by the axial length (height) $g_1$ of the first support portion $1c$:

$$g_1 > g_0 \left[1 - \frac{(K + \rho_1 E)(1 + \alpha_{SS}\Delta T)(1 + 3\alpha_{LC}\Delta T)}{K(1 + \alpha_{SS}\Delta T) + \rho_1 E(1 + 3\alpha_{LC}\Delta T)}\right] \quad (9)$$

If the above correction for the linear expansion coefficients is taken into consideration also in formula (9), the following formula (10) follows:

$$g_1 > g_0 \left[1 - \frac{(K + \rho_1 E)(1 + f_1\alpha_{SS}\Delta T)(1 + 3f_2\alpha_{LC}\Delta T)}{K(1 + f_1\alpha_{SS}\Delta T) + \rho_1 E(1 + 3f_2\alpha_{LC}\Delta T)}\right] \quad (10)$$

On the other hand, upon application of external stress to the liquid crystal display panel 10, the spacer supporting the substrate can serve as a spacer having support area A1+A2, that is, the sum of the support area A1 and the support area A2, by supporting the substrate with the first support surface $1a$ and the second support surface $1b$, that is, with the second support portion $1d$.

In this case, if the relation between the support area A1+A2 and the support area A of the spacer 101 of the comparative example satisfies the following formula (11), the substrate can be supported with a spacer having a larger support area than the spacer 101, and hence the variation of the gap g can be easily held down. This facilitates avoiding gap/color unevenness due to external force. Here, the support area A can be set to the support area of a known cylindrical spacer, and the spacer 1 satisfying the relation of formula (11) can be easily designed.

$$A_1 + A_2 < A \quad (11)$$

Furthermore, the variation $\Delta g_2$ of the gap g due to the plastic deformation of the spacer 1 upon application of external stress can be expressed by the following formula (12):

$$\Delta g_2 = g_0 \cdot \varepsilon_P(\sigma) \cdot \frac{\sigma}{\rho_2} \quad (12)$$

where $\rho_2$ is the area density of the cross-sectional area of the second support portion $1d$ (total of the cross-sectional area A1+A2 of the second support portion $1d$ for all the spacers 101 disposed/total area of the display portion of the liquid crystal display panel), $\sigma$ is the stress externally applied to the substrate, and $\varepsilon_P(\sigma)$ is the plastic strain of the spacer 1, which is a function of the externally applied stress $\sigma$.

It is only necessary that this variation $\Delta g_2$ not exceed a prescribed allowable value $g_C$, which is determined from the material properties of the spacer 1. Thus the relation of the following formula (13) follows:

$$|\Delta g_2| < |g_C| \quad (13)$$

From formulas (12) and (13), the following formula (14) is derived as a requirement for the area density to be satisfied by the cross section of the second support portion $1d$:

$$\rho_2 > \frac{g_0 \cdot \varepsilon_P(\sigma) \cdot \sigma}{g_C} \quad (14)$$

FIG. 3 illustrates the result of simulation analysis for the deformation of the spacer 1 under low-temperature environment.

In the simulation, the temperature of the liquid crystal 2 is decreased 30° C. from room temperature, and the analysis is based on a ¼ model in view of symmetry. Furthermore, the spacer 1 satisfies the requirements of the above formulas (6) and (10).

Figure 3A:
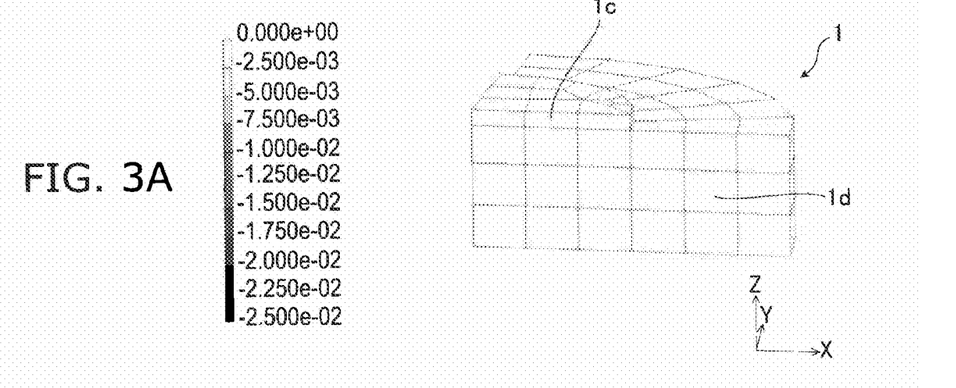
FIGS. 3A to 3C illustrate results of simulation analysis for the deformation of the spacer 1 under low-temperature environment.
Figure 3B:
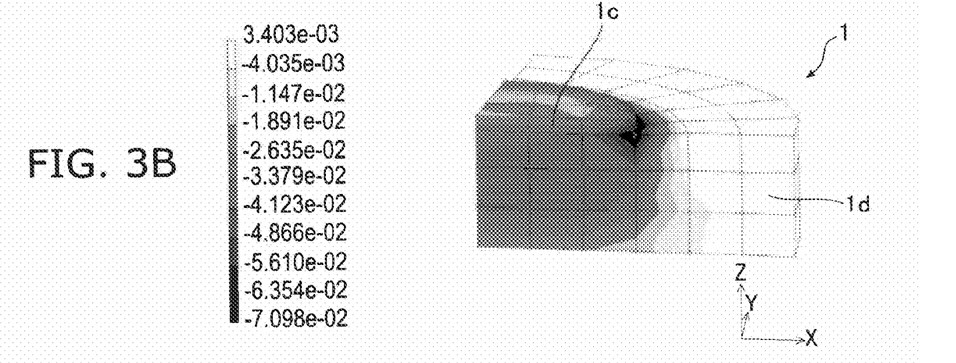
Figure 3C:
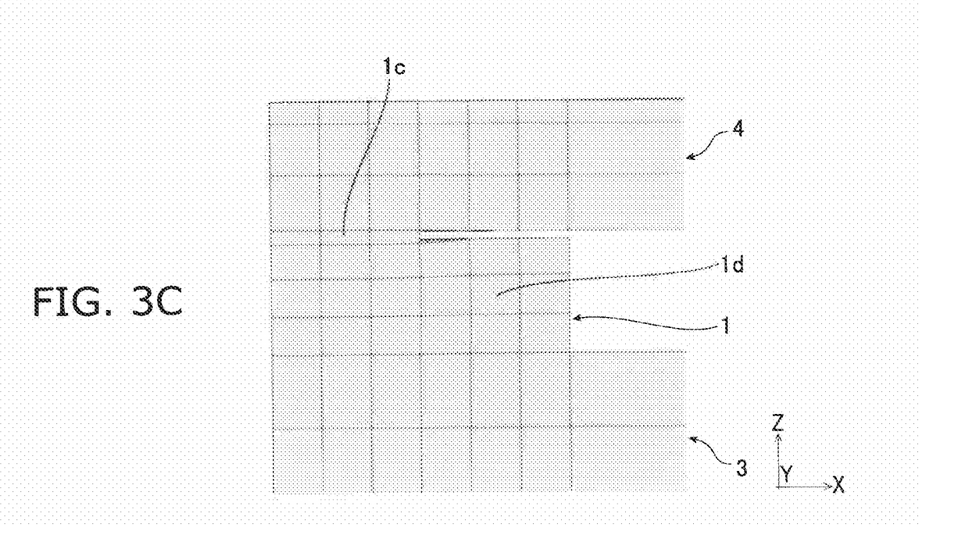

FIG. 3A shows the initial state (at room temperature), and FIGS. 3B and 3C show the state in which the temperature of the liquid crystal 2 is decreased 30° C. from room temperature. FIG. 3C is an enlarged cross-sectional view for FIG. 3B. In FIG. 3B, darker tone indicates greater strain. In FIGS. 3A to 3C, the same portions as those described with reference to FIGS. 1 and 2 are marked with like reference numerals, and the description thereof is omitted.

As seen from FIG. 3B, strain in the spacer 1 under low-temperature environment concentrates on the first support portion $1c$. As seen from FIG. 3C, the array substrate 4 is not in contact with the second support surface $1b$, and the substrate is supported with only the first support portion $1c$ during periods of low temperature.

Hence it turns out that the spacer 1 can be allowed to shrink easily, which allows free thermal shrinkage of the liquid crystal 2 and facilitates preventing the generation of low-temperature bubbles.

FIG. 4 illustrates the result of simulation analysis for the deformation of the spacer 1 upon application of external stress to the substrate.

In the simulation, a stress of 1.02 MPa is applied to the substrate, and the analysis is based on a ¼ model in view of symmetry. Furthermore, the spacer 1 satisfies the requirements of the above formula (14).

Figure 4A:
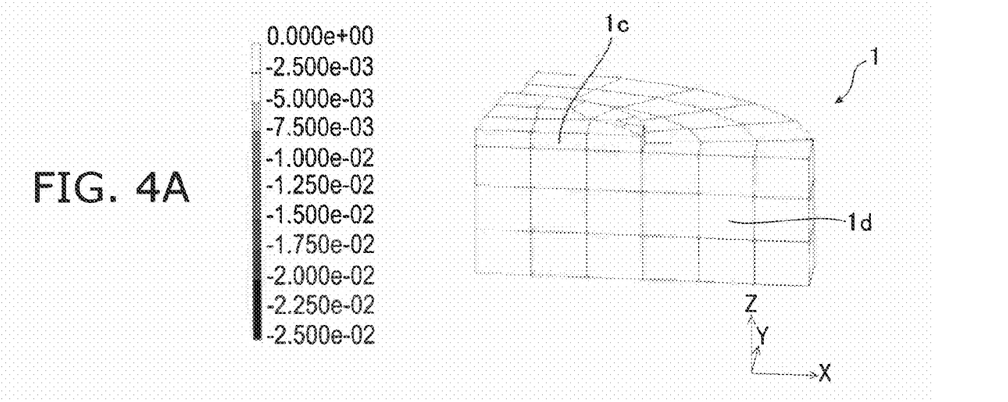
FIGS. 4A to 4C illustrate results of simulation analysis for the deformation of the spacer 1 upon application of external stress to the substrate.
Figure 4B:
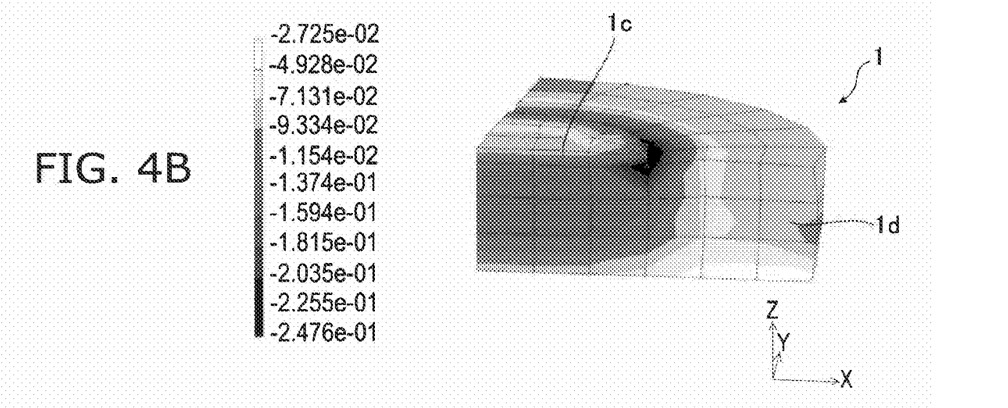
Figure 4C:
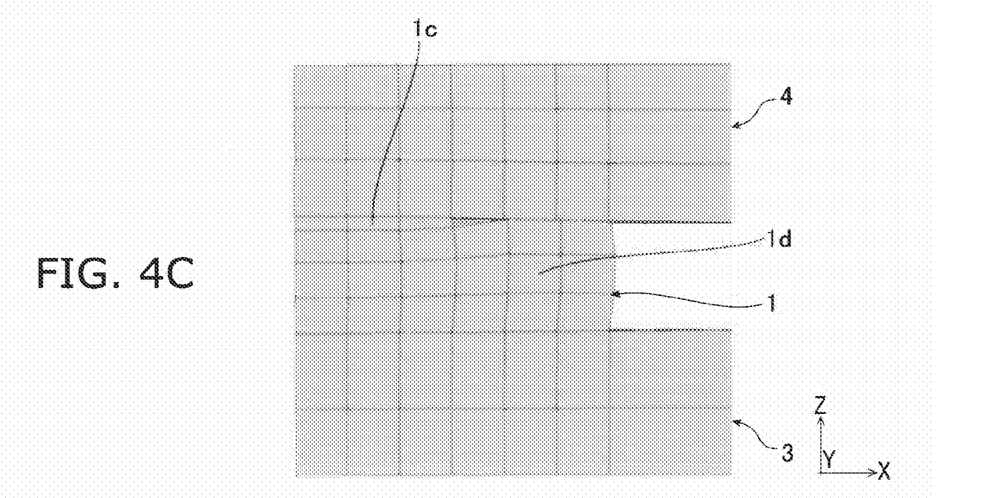

FIG. 4A shows the initial state (without applied stress), and FIGS. 4B and 4C show the state in which a stress of 1.02 MPa is applied to the substrate. FIG. 4C is an enlarged cross-sectional view for FIG. 4B. In FIG. 4B, darker tone indicates greater strain. In FIGS. 4A to 4C, the same portions as those described with reference to FIGS. 1 and 2 are marked with like reference numerals, and the description thereof is omitted.

As seen from FIG. 4B, strain in the spacer 1 during application of stress occurs primarily in the first support portion $1c$, but also occurs in the second support portion $1d$. As seen from FIG. 4C, the array substrate 4 is in contact with the second support surface $1b$, and the substrate is supported with the first support portion $1c$ and the second support portion $1d$ during application of stress.

Hence it turns out that the variation of the gap g can be easily held down, which facilitates avoiding gap/color unevenness due to external force.

As described above, the spacer 1 according to this embodiment supports the substrate with the smaller support area A1 during periods of low temperature, and hence can allow free thermal shrinkage of the liquid crystal, preventing the generation of low-temperature bubbles. On the other hand, upon application of external stress, the support area increases to A1+A2, and hence the variation of the gap g can be held down. Furthermore, during periods of low temperature, the substrate is supported with at least the first support portion $1c$. Hence the portions where the substrate is not supported as disclosed in Patent Documents 1 and 2 do not occur. Thus color unevenness due to substrate warp can be avoided more effectively. Moreover, because the height of the spacers can be equalized, the stress applied to the spacers can be distributed, and the plastic deformation of the spacer can also be prevented.

Figure 5A:
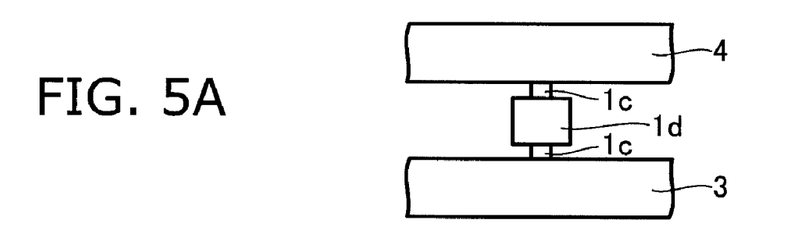
FIGS. 5A to 5D are schematic views for illustrating examples of spacers.
Figure 5B:
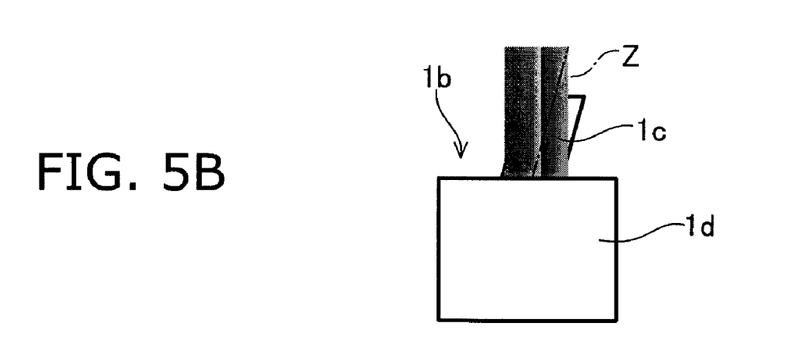
Figure 5C:
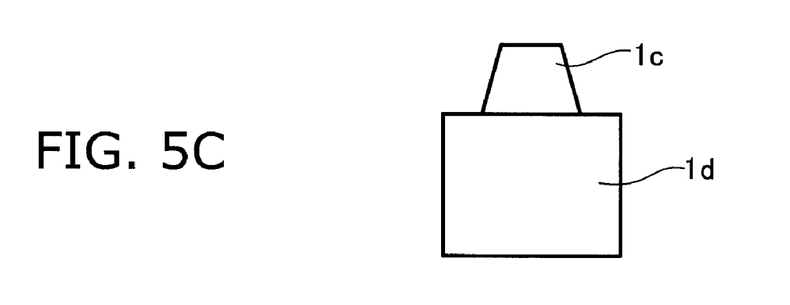
Figure 5D:
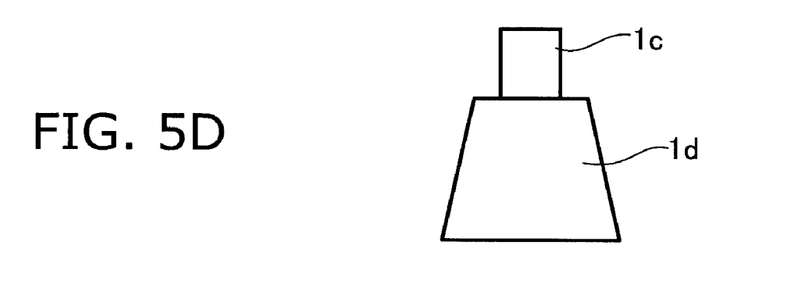

It is noted that, for convenience of description, the first support portion $1c$ is provided on one of the support surfaces of the second support portion $1d$ in the examples shown in FIGS. 1A and 1B. However, as exemplarily shown in FIG. 5A, the support portion $1c$ can be provided on both of the support surfaces. Furthermore, in the above description, the first support portion $1c$ is generally perpendicular to the support surface. However, as exemplarily shown in FIG. 5B, the support portion $1c$ may be provided so that its axis z is inclined to the second support surface $1b$. Further, the cross-sectional area of the first support portion $1c$ and the second support portion $1d$ may be gradually decreased or increased, or arbitrarily varied, as exemplarily shown in FIGS. 5C and 5D.

Figure 6A:
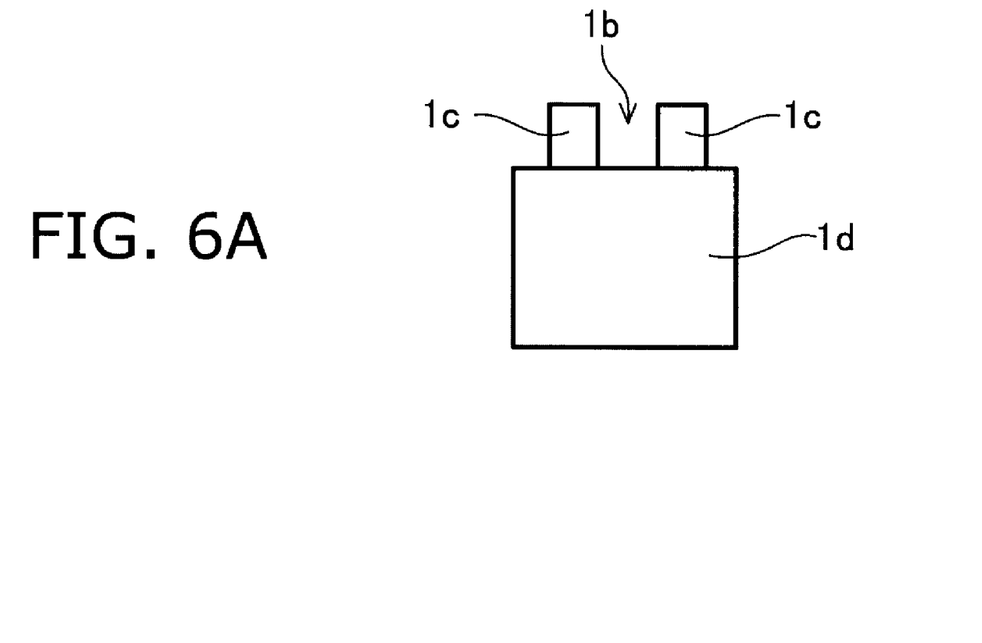
FIGS. 6A and 6B are schematic views for illustrating examples of spacers.

Furthermore, the number of support portions $1c$ is not limited to the above example. For instance, as exemplarily shown in FIG. 6A, it is also possible to provide a plurality of support portions $1c$ on the second support surface $1b$.

Figure 6B:
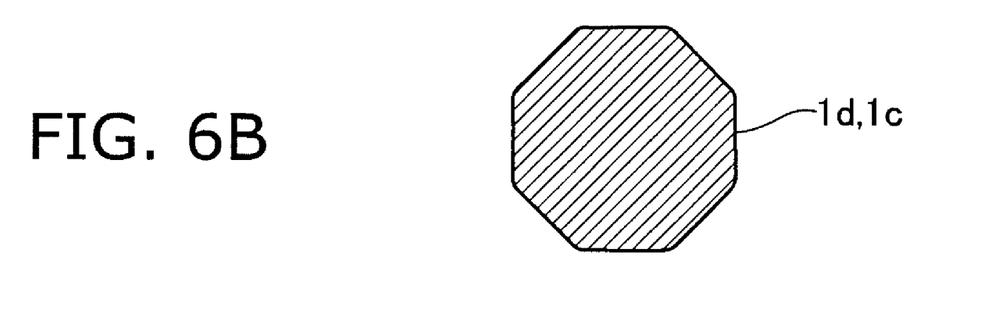

Moreover, the shape of the cross section perpendicular to the axis of the spacer is not limited to a circle, but can alternatively be a polygon, for example. However, if the cross section has a circular, oval or other shape without corners as exemplarily shown in FIG. 6B, the stress applied to the spacer can be made uniform, and chipping and peeling can be prevented.

Next, a method for manufacturing a spacer according to an embodiment of the invention is described.

FIG. 7 is a schematic process cross-sectional view for illustrating a method for manufacturing a spacer of a liquid crystal display panel according to the embodiment of the invention.

Figure 7A:
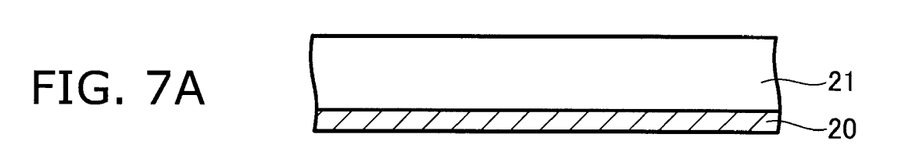
FIGS. 7A to 7D are schematic process cross-sectional views for illustrating a method for manufacturing a spacer of a liquid crystal display panel according to the embodiment of the invention.

First, as shown in FIG. 7A, a photocurable resin composition is applied to one side of a substrate 20 to form a coating 21. The application method is not particularly limited, but can illustratively be the slot die method, slit coater method, gravure coater method, spin coater method, screen printing method, flexography printing method, or ink jet method.

Figure 7B:
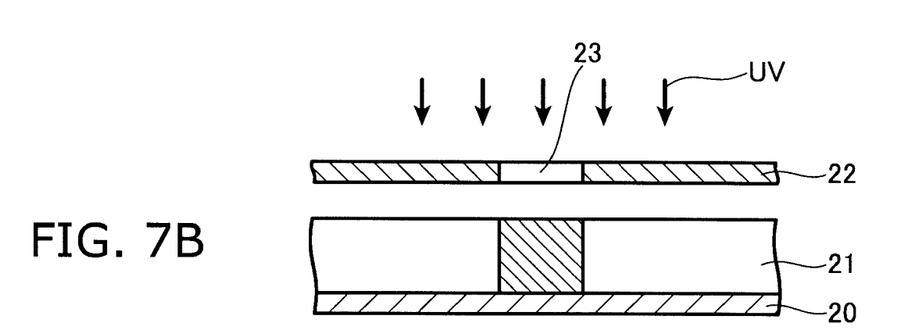

Next, as shown in FIG. 7B, the coating is irradiated with ultraviolet radiation UV through a photomask 22 having a prescribed transmitting portion 23 to cure the photocurable resin, thereby forming a second support portion $1d$.

Figure 7C:
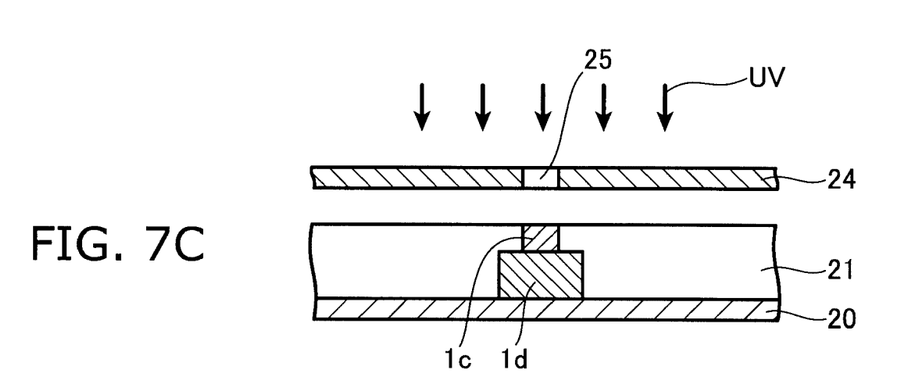

Next, as shown in FIG. 7C, a photocurable resin composition is further applied, and the coating is irradiated with ultraviolet radiation UV through a photomask 24 having a prescribed transmitting portion 25 to cure the photocurable resin, thereby forming a first support portion $1c$ on the inner side of the second support surface $1b$ of the second support portion $1d$.

Figure 7D:
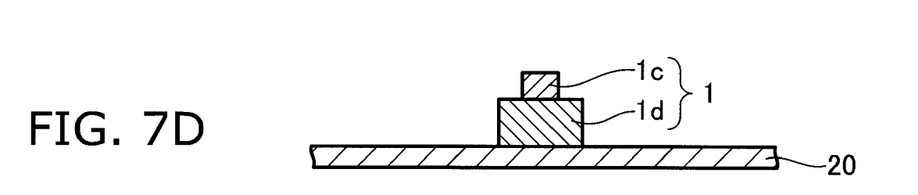

Subsequently, the substrate 20 is washed with alkali solution. Thus a spacer 1 having a desired shape as shown in FIG. 7D can be manufactured.

FIG. 8 is a schematic process cross-sectional view for illustrating a method for manufacturing a spacer of a liquid crystal display panel according to another embodiment of the invention.

Figure 8A:
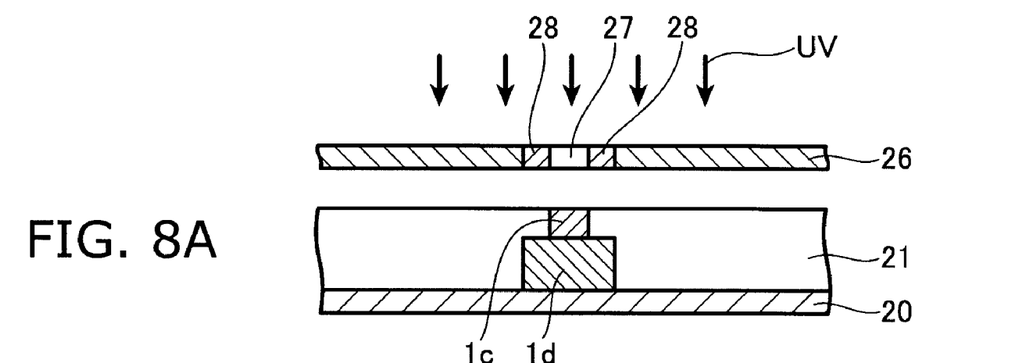
FIGS. 8A and 8B are schematic process cross-sectional views for illustrating a method for manufacturing a spacer of a liquid crystal display panel according to another embodiment of the invention.
Figure 8B:
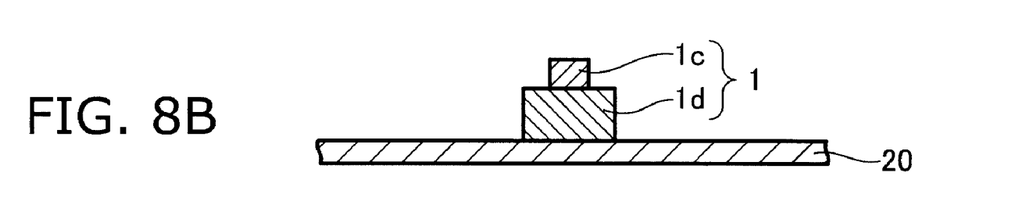

In this embodiment, as shown in FIG. 8A, a photomask 26 is provided with a transmitting portion 27 and a transmitting portion 28 having different transmittances for ultraviolet radiation UV to vary the area and depth of curing. In this case, the curing rate is slower in the region directly below the transmitting portion 28 having a low transmittance than in the region directly below the transmitting portion 27 having a high transmittance. Hence a first support portion $1c$ is formed on the inner side of the second support surface $1b$ of the second support portion $1d$. Subsequently, the substrate 20 is washed with alkali solution. Thus a spacer 1 having a desired shape as shown in FIG. 8B can be manufactured. It is noted that application of the photocurable resin composition is similar to that described with reference to FIGS. 7A through 7D, and hence the description thereof is omitted.

If the transmittance for ultraviolet radiation in the transmitting portion is continuously varied, the axial cross section of the spacer can be formed into an arbitrary shape such as a curved surface, a beveled surface, or a shape having gradually increasing or decreasing cross-sectional area.

The number and arrangement of the transmitting portions are not limited to the above example, but can be suitably varied depending on the number and arrangement of the support portions $1c$. For example, if a plurality of first support portions $1c$ are formed on the inner side of the second support surface $1b$, a plurality of transmitting portions can also be provided accordingly.

In the manufacturing methods illustrated in FIGS. 7A through 8B, the substrate on which the spacer is formed may be either the color filter substrate 3 or the array substrate 4.

Next, a method for manufacturing a liquid crystal display panel according to an embodiment of the invention is described.

For convenience of description, a method for manufacturing a TFT (thin film transistor) color liquid crystal display panel is described.

The process for manufacturing a TFT color liquid crystal display panel comprises the steps of forming a TFT array, forming a color filter, forming an orientation film, laminating the substrates, injecting a liquid crystal, and cutting the substrates.

Here, in the case where the above spacer according to the embodiment of the invention is provided on the color filter substrate side, the above method for manufacturing a spacer is performed after or during the step of forming a color filter.

In the case where the above spacer according to the embodiment of the invention is provided on the array substrate side, the above method for manufacturing a spacer is performed after or during the step of forming a TFT array.

The other steps in the method for manufacturing a liquid crystal display panel can be based on known techniques for the respective steps, and hence the description thereof is omitted.

For convenience of description, a method for manufacturing a TFT color liquid crystal display panel is described in the foregoing. However, also in a TN (twisted nematic) type liquid crystal display panel and an STN (supertwisted nematic) type liquid crystal display panel, the spacer according to the embodiment of the invention can be formed similarly.

Next, a liquid crystal display device according to the embodiment of the invention is described.

The liquid crystal display device according to this embodiment comprises the above liquid crystal display panel according to this embodiment and mechanism members.

The mechanism members illustratively include a driver IC, a driving circuit for generating a control signal to be inputted to the driver IC, and a backlight.

Furthermore, a cover and the like can also be suitably provided as needed.

The mechanism members and the cover can be based on known techniques, and hence the description thereof is omitted.

Next, a method for manufacturing a liquid crystal display device according to the embodiment of the invention is described.

In the manufacturing of a liquid crystal display device according to this embodiment, a liquid crystal display panel is manufactured by the above method for manufacturing a liquid crystal display panel according to this embodiment, and mechanism members are installed on the manufactured liquid crystal display panel.

Subsequently, a cover and the like are suitably attached as needed, and the manufacturing of a liquid crystal display device is completed.

Installation of the mechanism members and attachment of the cover can be based on known techniques, and hence the description thereof is omitted.

The embodiments of the invention have been described. However, the invention is not limited to the above description.

The above embodiments can be suitably modified by those skilled in the art without departing from the spirit of the invention, and such modifications are also encompassed within the scope of the invention.

For example, the shape, dimension, material, and arrangement of the components in the spacer 1, the liquid crystal display panel 10, the photomask 22, the photomask 24, and the photomask 26 are not limited to the above examples, but can be suitably modified.

Furthermore, the components included in the above embodiments can be combined with each other as long as feasible without departing from the spirit of the invention, and such combinations are also encompassed within the scope of the invention.

The invention claimed is:

1. A liquid crystal display panel comprising:
a pair of substrates;
a cylindrical spacer configured to hold a gap between the pair of substrates, and
a liquid crystal which fills the gap;
the cylindrical spacer including a first support portion having a first support surface and a second support portion having a second support surface,
the first support portion being provided inside the second support surface so that the first support surface is projected from the second support surface,
the second support portion being provided on a major surface of one of the substrates,
an area density $\rho_1$ of the first support surface satisfies relation (15):

$$\rho_1 < \frac{KP_C(1 + f_1\alpha_{SS}\Delta T)}{E[K(3f_2\alpha_{LC} - f_1\alpha_{SS})\Delta T - P_C(1 + 3f_2\alpha_{LC}\Delta T)]} \quad (15)$$

where $\alpha_{LC}$ is linear expansion coefficient of the liquid crystal, $\alpha_{SS}$ is linear expansion coefficient of the spacer, $f_1$ is a factor for correcting the linear expansion coefficient $\alpha_{SS}$ of the spacer, $f_2$ is a factor for correcting the linear expansion coefficient $\alpha_{LC}$ of the liquid crystal, K is bulk modulus of the liquid crystal, E is Young's modulus of the spacer, $\Delta T$ is a temperature variation, and $P_C$ is a threshold of pressure at which bubbles are generated;

an axial length $g_1$ of the first support portion satisfies relation (16):

$$g_1 > g_0\left[1 - \frac{(K + \rho_1 E)(1 + f_1\alpha_{SS}\Delta T)(1 + 3f_2\alpha_{LC}\Delta T)}{K(1 + f_1\alpha_{SS}\Delta T) + \rho_1 E(1 + 3f_2\alpha_{LC}\Delta T)}\right] \quad (16)$$

where $g_0$ is an initial value of the gap, $\rho_1$ is the area density of the first support surface, $\alpha_{LC}$ is linear expansion coefficient of the liquid crystal, $\alpha_{SS}$ is linear expansion coefficient of the spacer, $f_1$ is a factor for correcting the linear expansion coefficient $\alpha_{SS}$ of the spacer, $f_2$, is a factor for correcting the linear expansion coefficient $\Delta_{LC}$ of the liquid crystal, K is bulk modulus of the liquid crystal, E is Young's modulus of the spacer, and $\Delta T$ is a temperature variation;

an area density $\rho_2$ of the second support surface satisfies relation (17):

$$\rho_2 > \frac{g_0 \cdot \varepsilon_P(\sigma) \cdot \sigma}{g_C} \quad (17)$$

where $g_0$ is an initial value of the gap, $g_C$ is an allowable variation, $\varepsilon_P(\sigma)$ is plastic strain of the spacer, and $\sigma$ is a stress externally applied to the substrate;
the substrates being supported by the first support portion according to a decrease in temperature, and
the substrates being supported by the first support portion and the second support portion upon application of external stress.

2. The liquid crystal display panel according to claim 1, wherein a plurality of the first support portions are provided inside the second support surface.

3. The liquid crystal display panel according to claim 1, wherein the first support portions are provided on both end surfaces of the second support portion.

4. The liquid crystal display panel according to claim 1, wherein the first support portion is provided substantially perpendicularly to the second support surface.

5. The liquid crystal display panel according to claim 1, wherein the first support portion is inclined to the second support surface.

6. The liquid crystal display panel according to claim 1, wherein the first support portion has a cross-sectional area gradually increasing or decreasing toward an end.

7. The liquid crystal display panel according to claim 1, wherein at least one of the first support portion and the second support portion has a cross section shape without corners, the cross section being parallel to the substrates.

8. The liquid crystal display panel according to claim 1, wherein at least one of the first support portion and the second support portion has a circular or oval cross section shape, the cross section being parallel to the substrates.

9. The liquid crystal display panel according to claim 1, wherein the spacer includes a photocurable resin.

10. A method for manufacturing a liquid crystal display panel, comprising:
forming a film of a photocurable resin on one major surface of a substrate; and irradiating the film with ultraviolet radiation through a photomask to cure the photocurable resin, the photomask having a plurality of transmitting portions having different transmittances for the ultraviolet radiation, the photomask including a transmitting portion having continuously varying transmittance for the ultraviolet radiation, the photomask being used to form a plurality of second support portions on the major surface so that a second support surface is projected from the major surface, and to form a first support portion inside the second support surface so that a first support surface is projected from the second support surface of each of the plurality of second support portions; and an area density $\rho_1$ of the first support surface satisfies relation (15):

$$\rho_1 < \frac{KP_C(1 + f_1\alpha_{SS}\Delta T)}{E[K(3f_2\alpha_{LC} - f_1\alpha_{SS})\Delta T - P_C(1 + 3f_2\alpha_{LC}\Delta T)]} \quad (15)$$

where $\alpha_{LC}$ is linear expansion coefficient of the liquid crystal, $\alpha_{SS}$ is linear expansion coefficient of the spacer, $f_1$ is a factor for correcting the linear expansion coefficient $\alpha_{SS}$ of the spacer, $f_2$ is a factor for correcting the linear expansion coefficient $\alpha_{LC}$ of the liquid crystal, K is bulk modulus of the liquid crystal, E is Young's modulus of the spacer, $\Delta T$ is a temperature variation, and $P_C$ is a threshold of pressure at which bubbles are generated;

an axial length $g_1$ of the first support portion satisfies relation (16):

$$g_1 > g_0\left[1 - \frac{(K + \rho_1 E)(1 + f_1\alpha_{SS}\Delta T)(1 + 3f_2\alpha_{LC}\Delta T)}{K(1 + f_1\alpha_{SS}\Delta T) + \rho_1 E(1 + 3f_2\alpha_{LC}\Delta T)}\right] \quad (16)$$

where $g_0$ is an initial value of the gap, $\rho_1$ is the area density of the first support surface, $\alpha_{LC}$ is linear expansion coefficient of the liquid crystal, $\alpha_{SS}$ is linear expansion coefficient of the spacer, $f_1$ is a factor for correcting the linear expansion coefficient $\alpha_{SS}$ of the spacer, $f_2$ is a factor for correcting the linear expansion coefficient $\alpha_{LC}$ of the liquid crystal, K is bulk modulus of the liquid crystal, E is Young's modulus of the spacer, and $\Delta T$ is a temperature variation;

an area density $\rho_2$ of the second support surface satisfies relation (17):

$$\rho_2 > \frac{g_0 \cdot \varepsilon_P(\sigma) \cdot \sigma}{g_C} \quad (17)$$

where $g_0$ is an initial value of the gap, $g_C$ is an allowable variation, $\varepsilon_P(\sigma)$ is plastic strain of the spacer, and $\sigma$ is a stress externally applied to the substrate.

11. A liquid crystal display device comprising:
a liquid crystal display panel; and
a mechanism member including a driving circuit,
the liquid crystal display panel including:
a pair of substrates;
a cylindrical spacer configured to hold a gap between the pair of substrates, and
a liquid crystal which fills the gap;
the cylindrical spacer including a first support portion having a first support surface and a second support portion having a second support surface,
the first support portion being provided inside the second support surface so that the first support surface is projected from the second support surface,
the second support portion being provided on a major surface of one of the substrates,
an area density $\rho_1$ of the first support surface satisfies relation (15):

$$\rho_1 < \frac{KP_C(1 + f_1\alpha_{SS}\Delta T)}{E[K(3f_2\alpha_{LC} - f_1\alpha_{SS})\Delta T - P_C(1 + 3f_2\alpha_{LC}\Delta T)]} \quad (15)$$

where $\alpha_{LC}$ is linear expansion coefficient of the liquid crystal, $\alpha_{SS}$ is linear expansion coefficient of the spacer, $f_1$ is a factor for correcting the linear expansion coefficient $\alpha_{SS}$ of the spacer, $f_2$ is a factor for correcting the linear expansion coefficient $\alpha_{LC}$ of the liquid crystal, K is bulk modulus of the liquid crystal, E is Young's modulus of the spacer, $\Delta T$ is a temperature variation, and $P_C$ is a threshold of pressure at which bubbles are generated;

an axial length $g_1$ of the first support portion satisfies relation (16):

$$g_1 > g_0\left[1 - \frac{K + \rho_1 E)(1 + f_1\alpha_{SS}\Delta T)(1 + 3f_2\alpha_{LC}\Delta T)}{K(1 + f_1\alpha_{SS}\Delta T) + \rho_1 E(1 + 3f_2\alpha_{LC}\Delta T)}\right] \quad (16)$$

where $g_0$ is an initial value of the gap, $\rho_1$ is the area density of the first support surface, $\alpha_{LC}$ is linear expansion coefficient of the liquid crystal, $\alpha_{SS}$ is linear expansion coefficient of the spacer, $f_1$ is a factor for correcting the linear expansion coefficient $\alpha_{SS}$ of the spacer, $f_2$ is a factor for correcting the linear expansion coefficient $\alpha_{LC}$ of the liquid crystal, K is bulk modulus of the liquid crystal, E is Young's modulus of the spacer, and $\Delta T$ is a temperature variation;

an area density $\rho_2$ of the second support surface satisfies relation (17):

$$\rho_2 > \frac{g_0 \cdot \varepsilon_P(\sigma) \cdot \sigma}{g_C} \quad (17)$$

where $g_0$ is an initial value of the gap, $g_C$ is an allowable variation, $\varepsilon_P(\sigma)$ is plastic strain of the spacer, and $\sigma$ is a stress externally applied to the substrate;

the substrates being supported by the first support portion according to a decrease in temperature, and the substrates being supported by the first support portion and the second support portion upon application of external stress.

\* \* \* \* \*